(12) United States Patent
Easley et al.

(10) Patent No.: US 10,657,527 B1
(45) Date of Patent: May 19, 2020

(54) CONFIGURABLE MANAGEMENT OF GHOST ACCOUNTS

(71) Applicant: United Services Automobile Association (USAA), San Antonio, TX (US)

(72) Inventors: Jeffrey Walton Easley, San Antonio, TX (US); Lee Adams, Shavano Park, TX (US); Juan Pablo Sandoval, Mico, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 337 days.

(21) Appl. No.: 15/645,315

(22) Filed: Jul. 10, 2017

Related U.S. Application Data (60) Provisional application No. 62/366,215, filed on Jul. 25, 2016.

(51) Int. Cl.
*G06Q 20/38* (2012.01)
*G06Q 20/34* (2012.01)
*G06Q 20/40* (2012.01)

(52) U.S. Cl.
CPC ......... *G06Q 20/385* (2013.01); *G06Q 20/341* (2013.01); *G06Q 20/3563* (2013.01); *G06Q 20/405* (2013.01)

(58) Field of Classification Search
CPC ...... G06Q 20/00; G06Q 20/30; G06Q 20/342; G06Q 20/341
USPC .......................................................... 705/41
See application file for complete search history.

(56) References Cited

U.S. PATENT DOCUMENTS

| | | | | |
|---|---|---|---|---|
| 2008/0255940 A1* | 10/2008 | Perreault | ............... | G06Q 20/00 705/14 |
| 2012/0150738 A1* | 6/2012 | Cage | ..................... | G06Q 20/40 705/40 |

* cited by examiner

*Primary Examiner* — Robert R Niquette
*Assistant Examiner* — Liz P Nguyen
(74) *Attorney, Agent, or Firm* — Fish & Richardson P.C.

(57) ABSTRACT

Techniques are described for managing ghost account(s) for user(s). A ghost account may be created with a ghost account number that is a digitally provisioned payment card number linked to a backend account of a user. The ghost account number may be used to conduct transactions in situations where the user may otherwise use their backend account number. One more constraints governing the use of the ghost account may be specified by the user and/or the backend account management service. For example, the user may request a ghost account to be used only to make payments to a particular merchant or service. As another example, the user may request a ghost account to be useable for a particular period of time and/or a particular number of uses. Transactions initiated through the ghost account may be completed using the backend account that is linked to the ghost account.

19 Claims, 7 Drawing Sheets

CONFIGURABLE MANAGEMENT OF GHOST ACCOUNTS

CROSS-REFERENCE TO RELATED APPLICATION

The present disclosure is related to, and claims priority to, U.S. Provisional Patent Application Ser. No. 62/366,215, titled "Configurable Management of Ghost Accounts," which was filed on Jul. 25, 2016, the entirety of which is incorporated by reference into the present disclosure.

BACKGROUND

Payment cards such as credit cards and debit cards are ubiquitous in a modern economy. Individuals may use a payment card to make purchases from traditional brick-and-mortar merchants and also to conduct transactions online through e-commerce web sites or other services. Banks, payment networks, merchants, and third party security services attempt to configure and/or modify their computing systems to detect and prevent fraudulent uses of payments cards in a variety of scenarios. Because new types of fraud and new methods of committing fraud are constantly being developed, the computing systems that detect and prevent fraud need to be constantly updated and improved in an attempt to stay ahead of those attempting to commit fraud.

SUMMARY

Implementations of the present disclosure are generally directed to account management. More specifically, implementations are directed to managing ghost account(s) for users based on constraint(s) that govern the use of the ghost account(s).

In general, innovative aspects of the subject matter described in this specification can be embodied in methods that include actions of: receiving an indication of an attempted use of a ghost account number in a transaction, wherein the ghost account number identifies a ghost account that is associated with a backend account of a user; accessing ghost account data for the ghost account number, the ghost account data indicating at least one constraint on use of the ghost account; and processing a payment for the transaction using the backend account of the user, based at least partly on determining that the attempted use complies with the at least one constraint.

Implementations can optionally include one or more of the following features: the ghost account is temporary; the at least one constraint is specified by one or more of the user and a backend service that manages the backend account for the user; the at least one constraint includes one or more of a location based constraint, a time based constraint, a number of uses constraint, a payee based constraint, a transaction type constraint, and a transaction amount constraint; a portion of the ghost account number corresponds to a portion of a backend account number of the backend account associated with the ghost account; the ghost account number is generated to include a same issuer identification number (IIN) as the backend account number; the ghost account number is generated and provided by a backend service that manages the backend account for the user; the actions further include receiving a request for creation of the ghost account associated with the backend account of the user; the actions further include creating the ghost account, including generating the ghost account number for the ghost account, and associating the ghost account with the backend account; the actions further include determining the at least one constraint on use of the ghost account; the actions further include providing the ghost account number to the user; the actions further include closing the backend account for the user; the actions further include creating a new backend account for the user; and/or the actions further include associating the ghost account with the new backend account.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Innovative aspects of the subject matter described in this specification can also be embodied in a card device comprising a processor and a memory that stores ghost account data for each of a plurality of ghost accounts, wherein the ghost account data for a respective ghost account indicates at least one constraint on use of the respective ghost account, and instructions which, when executed by the processor, cause the processor to perform operations including: detecting an attempted read of the card device by a merchant system; determining an active ghost account of the plurality of ghost accounts; and providing, in response to the attempted read, a ghost account number of the active ghost account based at least partly on determining that the attempted read complies with the at least one constraint on the use of the active ghost account.

Implementations can optionally include one or more of the following features: the card device further includes a control; the operations further include detecting a manipulation of the control and, in response, setting the active ghost account; the control is a button; the manipulation is at least one press of the button; and/or the manipulation causes the setting of the active ghost account to be a next ghost account in a list of the plurality of ghost accounts that is stored in the memory.

Implementations of the present disclosure provide one or more of the following technical advantages and/or technical improvements over previously available systems. Through the use of ghost accounts that are constrained according to user-specified and/or issuer-specified constraint(s), implementations mitigate or in some instances eliminate the risk of fraud that is present in traditional payment systems. Accordingly, implementations reduce or avoid the expenditure of processing power, memory, storage capacity, network capacity, and/or other computing resources that traditional payment systems expend to prevent fraud and/or recover from instances of fraud. The use of constrained ghost accounts also prevents the accidental, inadvertent performance of transactions that are undesirable to the owner of the account, even in instances where fraud is not present. Thus, implementations avoid the expenditure of processing capacity, memory, network resources, and/or other computing resources that would otherwise be consumed by rolling back an undesirable transaction.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to systems, devices, methods, and computer-readable media for managing one or more ghost accounts, having respective ghost account numbers assigned thereto, for one or more users. As used herein, a ghost account number is a digitally provisioned payment card number that may be linked to a backend account of a user. A ghost account number may be used by the user to conduct transactions in situations where the user may otherwise use their actual backend account number to conduct transactions. A user may request that a ghost account be created that is associated with the user's backend account (e.g., bank account, credit card account, etc.). In some instances, the user may request various constraints on the use of the ghost account. For example, the user may request a ghost account to be used only to make payments to a particular merchant or service (e.g., a gym membership, utility company, etc.). As another example, the user may request a ghost account to be active for a particular period of time (e.g., one month) and/or to be useable for a particular number of uses (e.g., 10 transactions, a single transaction, etc.). The user may specify other constraints on the use of the ghost account as described further below. A ghost account number may be generated for the ghost account, and the user may use the ghost account number to make purchases and/or otherwise conduct transactions with merchants or other types of services. Transactions initiated through the ghost account may be completed using the backend account that is linked to the ghost account. A ghost account may also be described as a virtual account.

Through the use of ghost accounts, a user and the backend service (e.g., bank, credit union, or other financial institution) may substantially mitigate the risk of fraud committed against the user's accounts. For example, a ghost card may be constrained to be used to make payments to a particular merchant, such as monthly payments for a gym membership. As another example, a ghost card may be constrained to particular types of uses, such as food purchases from grocery stores. In such examples, any attempted use of the ghost account number outside of the constrained uses may be blocked (e.g., the requested transaction may be denied). Accordingly, even if an unauthorized user were able to obtain the ghost account number, the number of possible fraudulent uses would be limited. In some instances, a ghost account may be temporary, in that the ghost account is constrained to be useable for a limited period of time (e.g., one day) and/or a limited number of uses (e.g., a single use). Such constraints would also limit the impact of fraud, or eliminate the possibility of fraud, were the ghost account number to fall into unauthorized hands.

The user may use a ghost account number in situations where using an actual backend account number may pose a risk of possible fraud. For example, if the user is conducting a transaction with another party that the user does not personally know and/or trust, the user may not wish to provide their backend account number (e.g., credit card number) to the other party. In such instances, the user may request a single-use (or otherwise limited use) ghost account number to use in the transaction with the other party.

Implementations also provide advantages for account management. In some implementations, a user interface (UI) may be provided that enables a user to view a transaction history for each of their ghost accounts. Because the ghost accounts may be constrained for particular uses or types of uses, the UI may enable the user to readily view a summary of their expenditures in various categories (e.g., utility bills, clothing expenses, food expenses, and so forth). Moreover, in instances where the user's backend (e.g., actual) account is compromised such that the old backend account is closed (e.g., frozen, suspended, deleted) and a new backend account number and payment card are created, the existing links between ghost account(s) and the old backend account may be automatically migrated to link to the new account without the need for any actions performed by the user. Accordingly, the user may continue to use their ghost account(s), and/or the automated payments set up using their ghost account(s), without needing to manually migrate those transactions to explicitly link to the new backend account. In this way, implementations provide an improved user experience over traditional systems in which the user may need to perform the arduous task of manually modifying each of their scheduled payments to ensure that such payments are made from a new account. In some implementations, if the backend account is canceled because of possible or detected fraud or for other reasons, the various ghost account(s) linked to the backend account may also be canceled. In some implementations, the use of the linked ghost account(s) may be suspended until the ghost account(s) are linked to a new backend account number issued to the user.

Figure 1A:
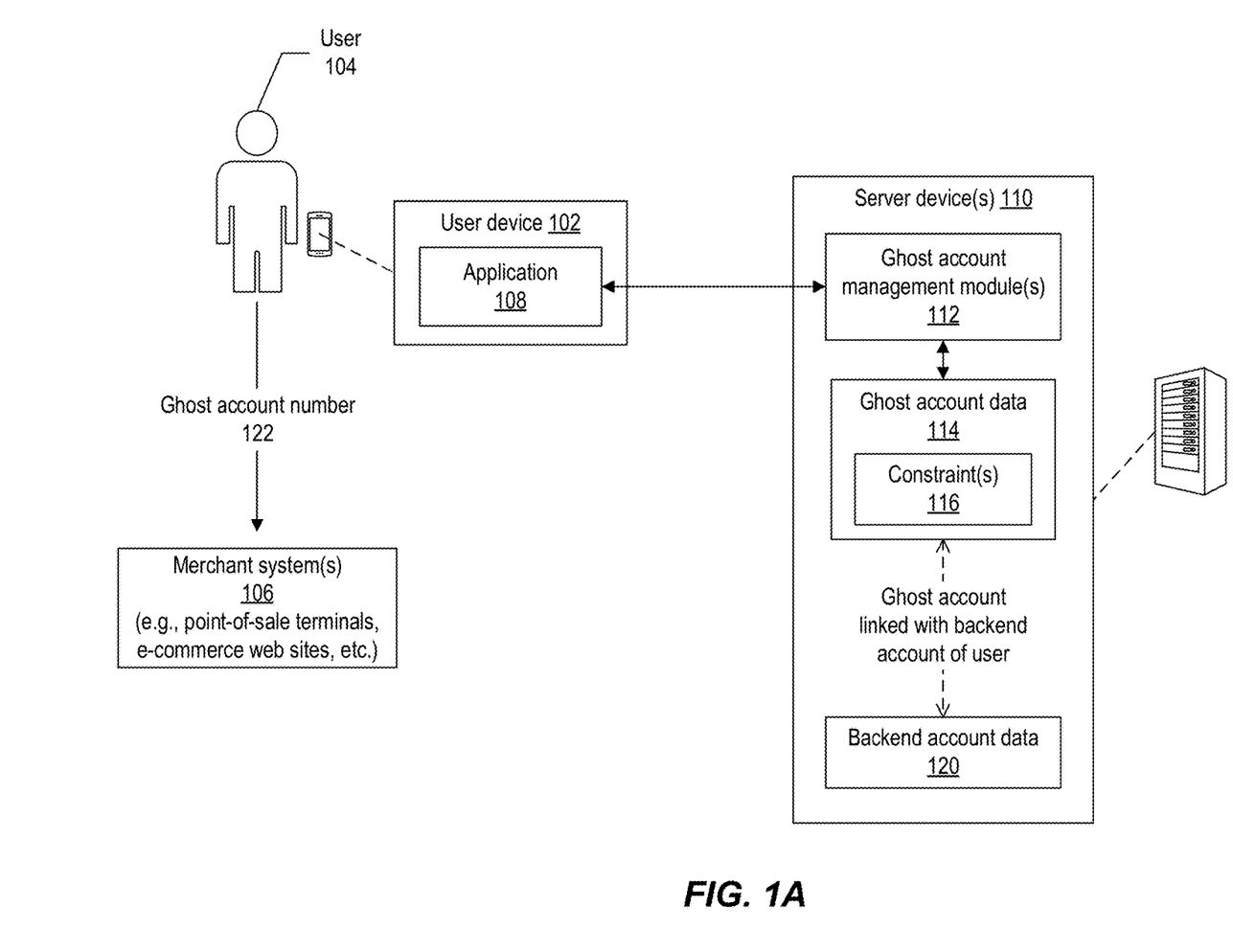
FIG. 1A depicts an example system for managing ghost accounts, according to implementations of the present disclosure.

FIG. 1A depicts an example system for managing ghost accounts, according to implementations of the present disclosure. As shown in the example of FIG. 1A, a user device 102 may be operated by a user 104. The user device 102 may be any suitable type of computing device. In some instances, the user device 102 is a portable (e.g., mobile) computing device such as a smartphone, wearable computing device, tablet computer, and so forth. The user device 102 may also be a less portable type of computing device such as a desktop computer, laptop computer, and so forth. The user device 102 may execute an application that is provides various features for managing ghost account(s) as described further below.

The user 104 may interact with various merchant system(s) 106 to pay for goods and/or services or otherwise conduct transactions. The merchant system(s) 106 may include point-of-sale (POS) terminals at a merchant site (e.g., store, shop, etc.). The merchant system(s) 106 may also include web sites and/or other applications for e-commerce (e.g., online shopping) and/or other types of services. For example, the merchant system(s) 106 may include web sites that enable the user 104 to make and/or schedule payments for utility service(s), club membership(s), finances (e.g., loan payments), insurance policies, and so forth. In some implementations, the user 104 may employ the user device 102 to interact with the merchant system(s) 106. For example, the user 104 may employ a web browser running on the user device 102 to interact with an e-commerce web site, utility web site, financial services web site, and so forth. As another example, the user device 102 may execute an application (e.g., a native app) that enables access to the merchant system(s) 106. As another example, the user device 102 may execute a digital wallet or other application that enables the user 104 to specify payment(s) to be made to the merchant system(s) 106. In some instances, the user 104 may interact with the merchant system(s) 106 independently of the user device 102, e.g., by directly interacting with a POS terminal at a merchant site. In some instances, the user 104 may interact with the merchant system(s) 106 telephonically using the user device 102 and/or some other voice communications system.

The application 108 may communicate, over one or more networks, with one or more ghost account management modules 112 executing on one or more server devices 110. The server device(s) 110 may include any suitable number and type of computing device. The ghost account management module(s) 112 may access ghost account data 114 stored on the server device(s) 110 or elsewhere. The ghost account data 114 may describe one or more ghost accounts that have been created for the user 104. The ghost account data 114 may be linked to backend account data 120 that describes at least one bank account, investment account, credit card account, debit card account, and/or another type of financial services account of the user 104. In some implementations, the ghost account(s) that have been created for the user 104 may be linked to the backend account of the user 104. For example, the user 104 may use a ghost account number 122 to make a purchase, pay for a service, and/or otherwise conduct a transaction with a merchant system 106. The ghost account number may be used as if it was the account number of an actual backend account (e.g., credit card number, debit card number, etc.) of the user 104. However, any payment that is made to complete the transaction may be made out of the user's backend account that is linked to the ghost account.

The ghost account data 114 for a ghost account may include but is not limited to: a ghost account number; a name and/or other identifying information of the user 104; a date and/or time when the ghost account was created; the backend account number associated with the ghost account; a (e.g., user-specified) name and/or description of the ghost account (e.g., "for gas bill"); scheduled transactions and/or transaction amounts to be paid using the ghost account; and so forth. In some implementations, the ghost account data 114 may include a history of transactions conducted using the ghost account. The ghost account data 114 for a ghost account may also include one or more constraints 116 that govern the use of the ghost account by the user 104. The constraint(s) 116 may be specified by the user 104 (e.g., through the application 108) and/or may be imposed by the backend service (e.g., the bank or other financial institution) that manages the backend account and/or ghost accounts for the user 104. The constraint(s) 116 may include but are not limited to one or more of the following:

Location based constraints. A ghost account may be constrained to be used only in a predetermined geographic area, such as one or more designated neighborhoods, boroughs, cities, counties, states, provinces, prefectures, districts, countries, continents, and so forth. In some instances, a ghost account may be constrained to be used only in an area that is within a threshold distance of a particular location (e.g., the user's home address). In some instances, the ghost account may be constrained to be used only at a location that is the same location (within a threshold distance) as the current location of the user device 102 and/or user 104. In some instances, the ghost account may be constrained to be used only at a location that is within a threshold distance of the user's home and/or business address, or within an area that is frequented by the user (e.g., within the user's home city, county, state, province, prefecture, etc.). The current location may be determined based on satellite-based navigation systems such as the Global Positioning System (GPS) or other techniques. In response to an attempted use, the location of the user device 102 (and/or the merchant) may be compared to the constraint to determine whether the attempted use is to be allowed or blocked.

Time based constraints. A ghost account may be constrained to be used only within a predetermined time period, such as a time period following the creation of the ghost account. For example, a ghost account may be created to be useable only for a day, a week, a month, and so forth. In some instances, a ghost account may be constrained to be used only on particular days of the week, in particular months, on holidays or non-holidays, only during certain times of day, and so forth. In some instances, a ghost account may be constrained to be useable only within a certain range of time, such as during certain days of the week or month, or during a certain portion of the day (e.g., useable from 6:00 a.m. through 11:00 p.m., but not useable during other times). In response to an attempted use, the current time at the location of the user device 102 (and/or the merchant) may be compared to the constraint to determine whether the attempted use is to be allowed or blocked.

Number of uses constraints. A ghost account may be constrained to be used a predetermined number of times, e.g., for a predetermined number of transactions. For example, a ghost account may be created for a single use, e.g., a single transaction, for 10 uses, 20 uses, 100 uses, and so forth. For each use, the ghost account management module(s) 110 (and/or software executing on a card device, as described below), may increment a tracked number of uses of the ghost account. If an attempted use would cause the tracked number of uses to exceed the allowed number of uses indicated by the constraint, the attempted use may be blocked.

Payee based constraints, e.g., based on particular merchant system(s) 106. A ghost account may be constrained to be used only to conduct transaction(s) with a particular merchant, such as a particular store, service, and so forth. For example, a ghost account may be used to pay a gym membership but not for other uses. As another example, a ghost account may be used to pay a particular utility bill but not for other uses.

Transaction type constraints, e.g., constraints based on types of uses. A ghost account may be constrained to be used only to conduct certain type(s) of transaction(s), e.g., with regard to particular economic sector(s). For example, a ghost account may be used to purchase food but not other types of products or services. As another example, a ghost account may be used for online transactions but not for other types of transactions.

Transaction amount constraints. A ghost account may be constrained according to individual and/or aggregate transaction amounts. For example, a ghost account may be used to make payments that are up to $100, but may be blocked from use for larger payments. The amount limitation may be per purchase and/or transaction. In some instances, the amount limitation may be on an aggregate amount over a period of time. For example, a ghost account may be used to make up to $100 worth of payments per day, but may be blocked from use once that threshold is met for a particular day.

The above constraint(s) 116 may be applied individually and/or in any suitable combination to constrain the use of a ghost account. For example, a ghost account may be constrained for use to purchase food from grocery stores but not from restaurants. As another example a ghost account may be used to make up to a certain amount of purchases per day in a particular geographic location, but may be blocked from use above that amount and/or in other locations. As another example, a ghost account may be created to be used once for a particular merchant, and may be blocked from use otherwise. In some instances, if an attempted use of a ghost account violates one or more constraints, a test may be applied to ensure that the user is physically, mentally, and/or emotionally sound. If the user passes the test, the use may be authorized. For example, the user 104 may attempt to use a ghost account to draw credits at a casino. A constraint may indicate that such a use is permitted if the user 104 can pass a test to demonstrate their mental fitness (e.g., to show they are not intoxicated), where the test is a riddle, puzzle, math problem, and so forth. The test may be presented through the user device, and the user's successful completion of the test can authorize the requested use of the ghost account.

In some implementations, the user 104 may employ the application 108 to request a new ghost account to be created and linked to the user's backend account. As part of the request for the new ghost account, the user 104 may specify particular constraint(s) 116 to be applied to the ghost account. The application 108 may also enable the user 104 to view their currently active ghost account(s) and, in some instances, modified the constraint(s) 116 that govern the use of the ghost account(s). Such management of ghost account(s) is described further with reference to FIGS. 2A and 2B.

In some implementations, the server device(s) 110 and/or ghost account management module(s) 112 may be operated by the backend service that manages the backend account and ghost accounts for the user(s) 104, such as a bank, credit union, and/or other financial institution that issues the backend account numbers and/or ghost account numbers.

Figure 1B:
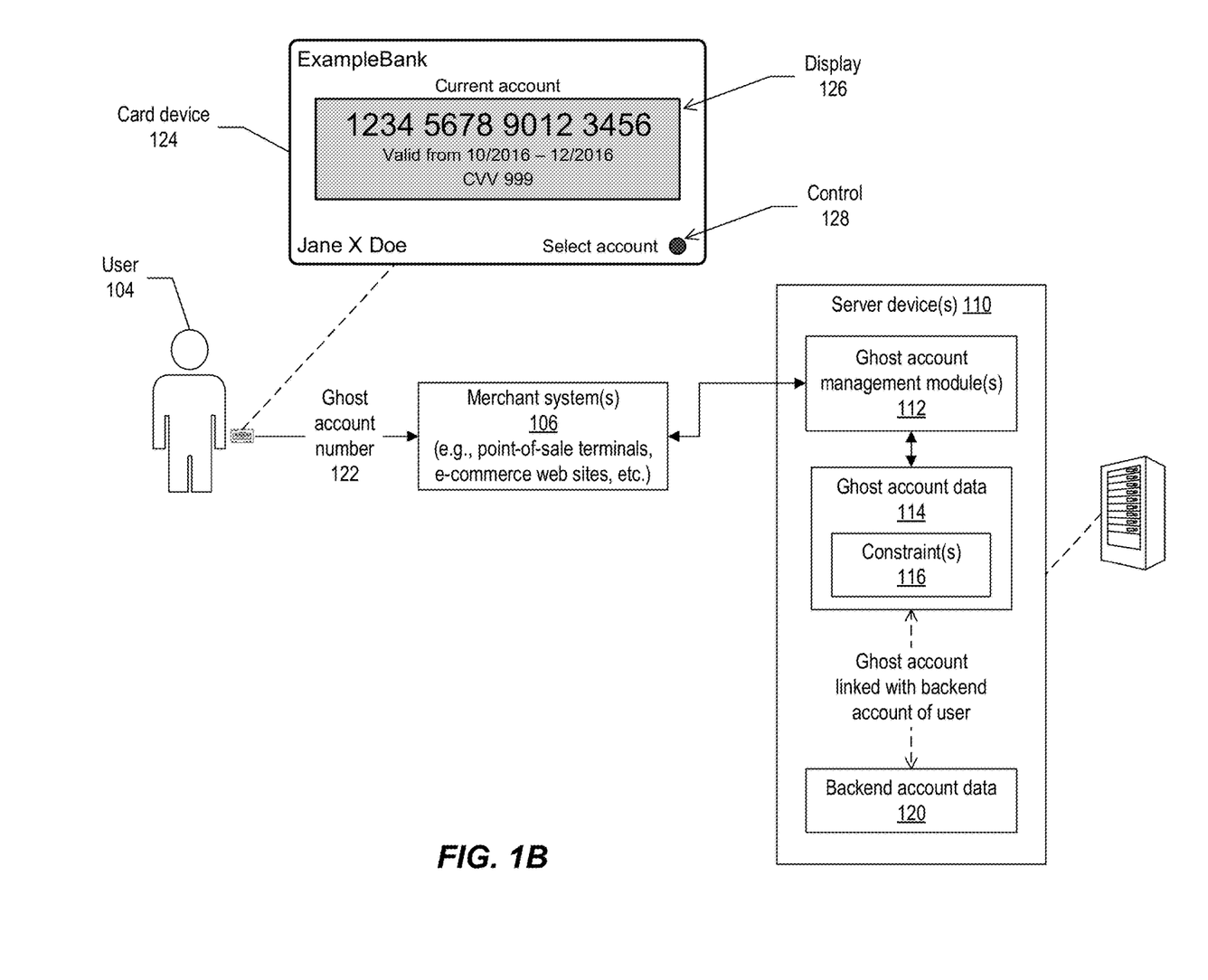
FIG. 1B depicts an example system for using ghost accounts, according to implementations of the present disclosure.

FIG. 1B depicts an example system for using ghost accounts, according to implementations of the present disclosure. In this example, the user 104 has a card device 124. The card device 124 is a small, portable computing device with approximately the size and form factor of a credit card. The card device 124 includes a memory that stores account information for any suitable number of ghost accounts that have been created for the user 104 and linked to the user's backend account. The card device 124 can also include a transceiver to enable wireless communications between the card device 124 and other computing device(s). The card device 124 includes a display 126 (e.g., an e-ink display) that shows the ghost account data for the ghost account that is currently active on the card device 124. The displayed ghost account data can include, but is not limited to, a ghost account number, CVV, name associated with the ghost account, description of the ghost account, bank or other financial institution that issued the ghost account, constraint(s) on use of the ghost account, and so forth. In some implementations, the display 126 shows the currently selected and active ghost account along with at least some information regarding the constraints governing use of the active ghost account, such as a time-based constraint as shown in the example. The card device 124 also includes a physical control 128 (e.g., a button) on the exterior of the card device 124. The control 128 may be manipulated (e.g., pressed) by the user 104 to select, from among the various ghost accounts that have been provisioned to the card device 124, a particular ghost account to be active on the card device 124. For example, the user 104 may press the control 128 (e.g., button) to select among the ghost accounts, where each press activates a next ghost account in a list of the ghost accounts currently stored in the memory of the card device 128.

Once the active ghost account is selected by the user, a swipe, scan, or other read of the card device enables a reader device (such as the merchant system) to retrieve, from the card device, the account information for the currently active ghost account. In instances where the card device includes a magnetic strip, reading the card device may include swiping the card device in a POS terminal or other reader device (e.g., merchant system) to retrieve the ghost account data (e.g., ghost account number) from the magnetic strip. In instances where the card device includes a scannable chip, such as a RFID or NFC chip, reading the card device may include sending a signal from the reader device to cause the chip to emit the ghost account data which is received by the reader device. In either case, the firmware or other software executing on the card device may instruct the strip or chip to emit the ghost account data associated with the particular ghost account that is currently active on the card device.

In some implementations, the card device 124 is provisioned by storing account information for one or more ghost accounts on the memory of the card device 124. Such provisioning may be performed using wireless (e.g., Bluetooth Low Energy) communications between a wireless transceiver of the card device 124 and the user device 102. For example, the user 104 may interact with the application 108 executing on the user device 102 to request a new ghost account to be created and associated with the user's backend account. The ghost account may be created, and the account information for the ghost account may be communicated to the application 108. The application 108 may then use a wireless connection with the card device 124 (e.g., a Bluetooth pairing between the user device and card device) to communicate the ghost account data to the card device 124. The ghost account data is stored in memory on the card device 124, such that the ghost account data is available as a selectable option from among the various ghost accounts stored on the card device 124.

When the card device 124 is swiped or otherwise read using the merchant system, the currently active ghost account data is provided to the merchant system as if it was the backend account information. The merchant system may request approval for the transaction using the ghost account data. The request may be received and processed by the ghost account management module(s) 112 which, as described above, may allow or deny the transaction based on whether the transaction satisfies any constraint(s) on the use of the ghost account. In some implementations, the constraints may be stored on the card device 124 instead of, or in addition to, being stored on the server device(s) 110. In such instances, firmware or other software executing on the card device 124 may apply the constraint(s) and, based on the context and/or circumstances (e.g., time, location, type of transaction, amount of transaction, etc.), determine whether the transaction is to proceed or not.

The card device 124 may also be described as a smart card, and includes smart card functionality that works in concert with the ghost account management system described herein. The card device 124, as a smart card, can include on-board memory and/or other technical capabilities that allow the card to store card information (e.g., ghost card numbers) any appropriate number (e.g., hundreds) of accounts. The card device 124 also includes a push button or other control, and a display (e.g., e-ink, LED, etc.) to present information regarding the currently selected and active account on the card. Through use of a smart card such as the card device 124, implementations incorporate the smart card capabilities as another way to control and manage the ghost accounts on the physical card device, in addition to managing the ghost accounts through other user interfaces such as mobile apps and/or websites, as described herein.

Figure 2A:
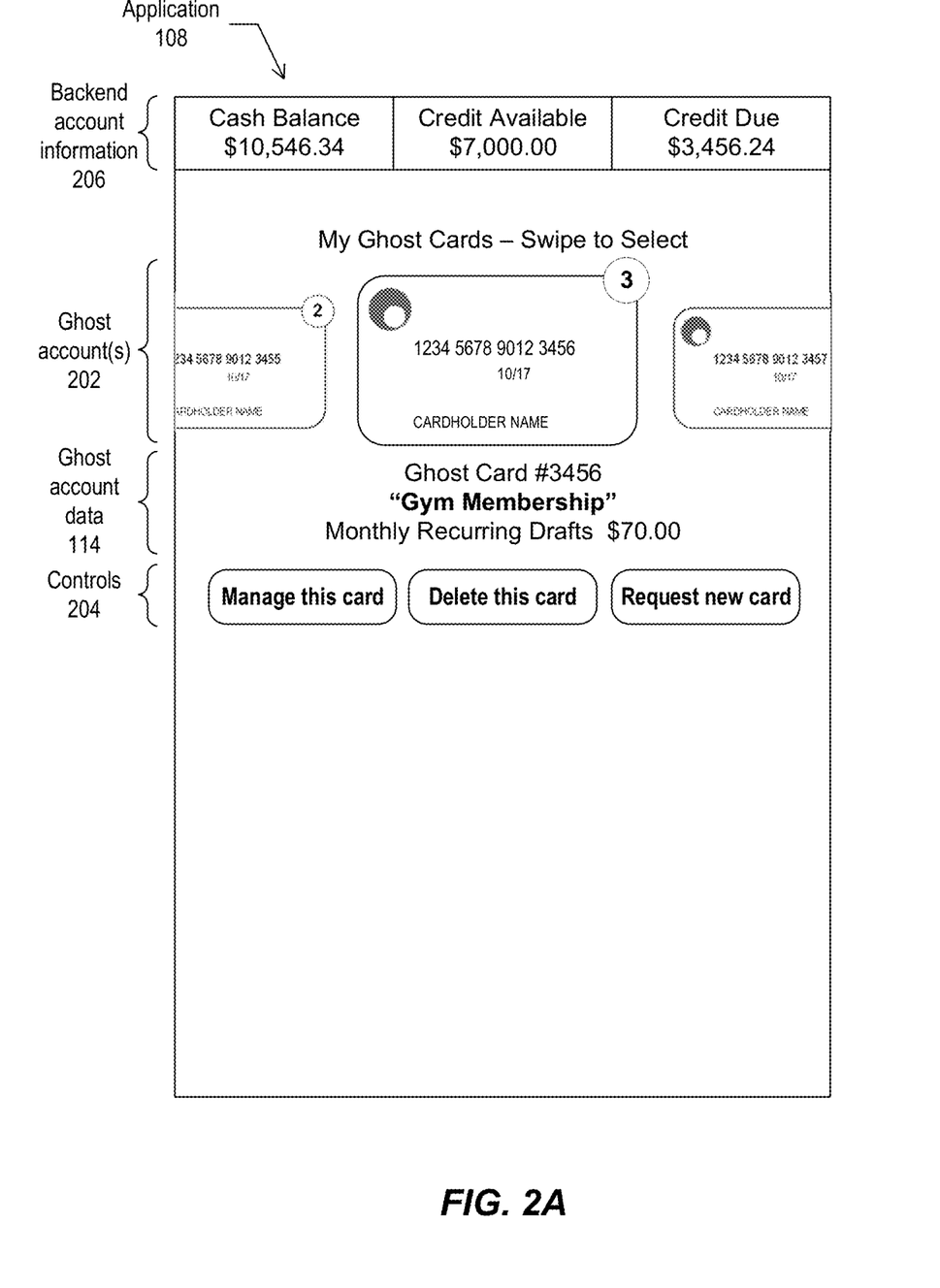
FIGS. 2A and 2B depict example user interfaces for managing ghost accounts, according to implementations of the present disclosure.
Figure 2B:
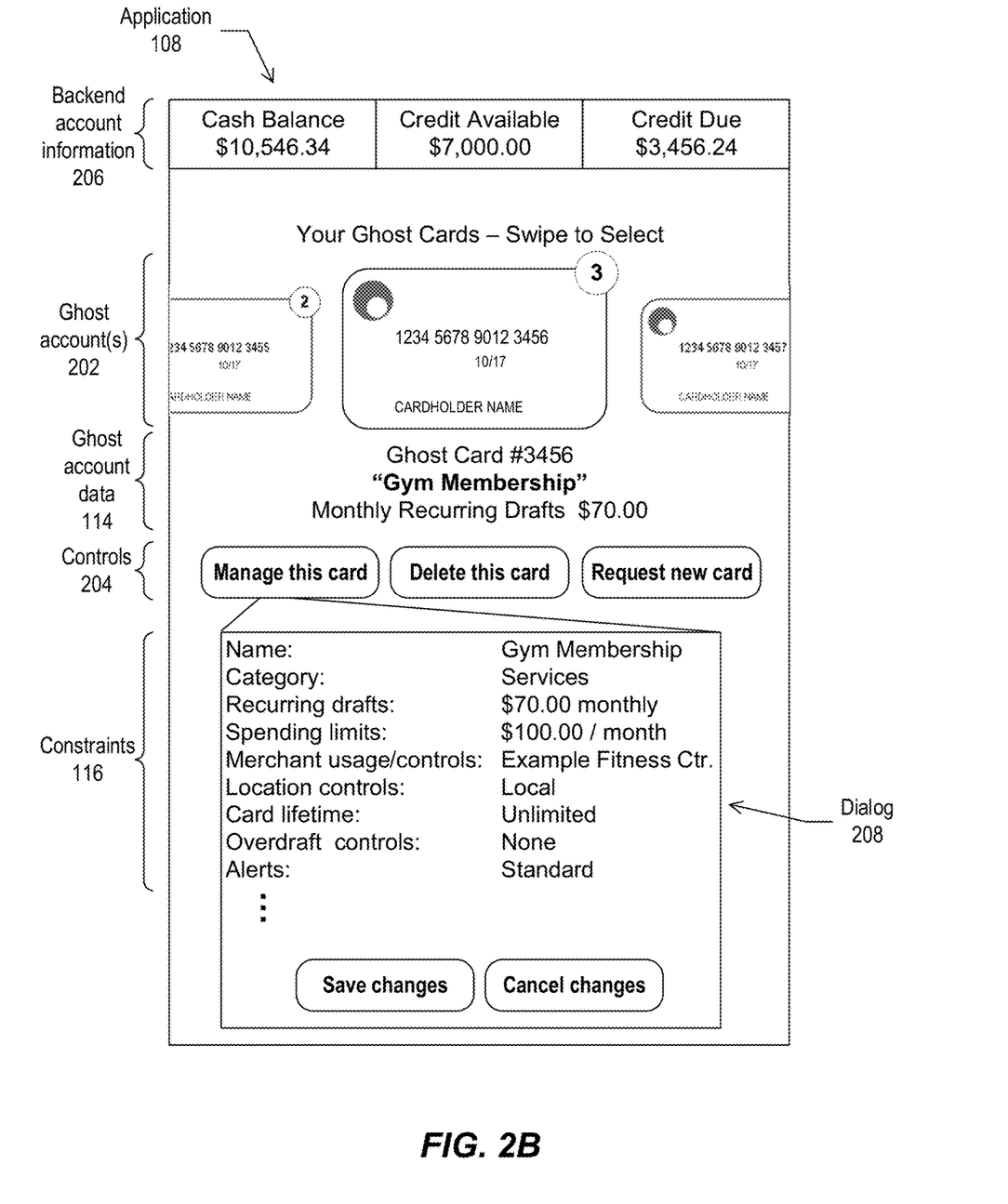

FIGS. 2A and 2B depict example UIs for managing ghost accounts, according to implementations of the present disclosure. In some instances, the UIs may be presented by the application 108 executing on the user device 102. The UIs of the application 108 may be described as a "command center" that enables the user 104 to adjust the settings and/or features of various ghost accounts, request new ghost accounts, delete ghost accounts, and/or perform other operations with respect to ghost accounts.

As shown in the example of FIG. 2A, the UI may present a selectable list 202 of the ghost account(s) that have been created for the user 104 who is currently logged into the application 108. In this example, the UI enables the user 104 to swipe left or right to navigate within a list of ghost accounts. In the particular example shown, the user 104 has selected to view information regarding a particular ghost account labeled with #3 and designed as ghost account number . . . 3456. In response to a selection of a particular ghost account, the UI may present ghost account data 114 regarding the selected ghost account. For example, the presented ghost account data 114 may include at least a portion of the ghost account number (e.g., 3456), a user-specified name for the ghost account (e.g., "Gym Membership"), and/or a summary of the past and/or future recurring drafts (e.g., $70 per month) transacted using the ghost account. The UI may also present one or more controls 204 that enable the user 104 to request additional operations to be performed with regard to the selected ghost account. For example, the user 104 may click (or otherwise gesture) on a "Manage this card" button to cause the UI to present further options for managing the ghost account, as shown in FIG. 2B. The user 104 may click on a "Delete this card" button to cause the ghost account management module(s) 112 to delete, remove, and/or de-provision the selected ghost account so that it may no longer be used. In some examples, the UI may present a control 204 that enables the user 104 to view a history of transactions that have been performed using the selected ghost account. The user 104 may click on a "Request new card" button to cause the ghost account management module(s) 112 to create a new ghost account for the user 104 and link the new ghost account to the user's backend account. The user 104 may also use the UI to suspend or freeze a ghost account, apply or adjust spending limits to the ghost account, change the backend account that is linked to a ghost account, and/or perform other actions.

In some implementations, the UI may present backend account information 206 associated with the backend account(s) of the currently logged in user 104. The backend account information 206 may include but is not limited to a current balance of the backend account, such as an amount owed on the account (e.g., if the backend account is a credit card account) or an amount of funds available in the account (e.g., if the backend account is a bank account). The backend account information 206 may include available credit, the amount of credit that is due (e.g., amount owed on the account), and/or other information.

In the example of FIG. 2B, the user 104 has selected the "Manage this card" control to cause the application 108 to present a ghost account management dialog 208 in the UI. As shown in the example of FIG. 2B, the dialog may present the list of constraint(s) 116, if any, that are currently applied to the selected ghost account. In some instances, the user 104 may employ the dialog to add new constraint(s) 116, remove constraint(s) 116, and/or modify existing constraint(s) 116. In some implementations, the backend service may apply constraint(s) 116 that may not be removed and/or modified by the user 104. In such instances, the dialog may present the constraint(s) 116 but not allow the user 104 to change or remove the constraint(s) 116. The dialog may also enable the user 104 to edit the (e.g., friendly) name of the ghost account. In the example of FIG. 2B, the user 104 has named the selected ghost account "Gym Membership". The ghost account is subject to various constraint(s) 116. For example, the ghost account may be used for a particular category of uses (e.g., services generally but not product purchases). In this example, the ghost account may only be used for a particular service (e.g., at "Example Fitness Center"), and may only be used within a particular geographic area (e.g., local, within a distance threshold of the user's home). In this example, the ghost account is not time-constrained, and may be used for an unlimited time (e.g., until deleted by the user 104 and/or backend service). In the example shown, the ghost account is also limited to being used for up to $100 worth of total transaction amount per month.

In some implementations, the dialog may also enable the user 104 to set various options for the ghost account. For example, the user 104 may specify overdraft controls that indicate how the backend service is to respond to overdrafts against the ghost account and/or backend account. For example, the backend service may allow overdrafts that are within a threshold amount, or disallow any overdrafts. In this example, the ghost account is not subject to any overdraft controls.

In some examples, the user 104 may specify options for alerts to be sent to the user 104 regarding the ghost account. In some instances, the user 104 may receive an alert when the ghost account is used to conduct a transaction. The alert may be a notification that is sent through email, text message (e.g., SMS and/or MMS), voice message, social network message, and/or other communications channels. The user 104 may employ the UI to specify whether alerts are to be sent, when the alerts are to be sent, and/or the circumstances when alerts are sent. For example, the user 104 may indicate that an alert is to be sent that describes each use and attempted use of the ghost account. In some instances, an alert may be sent to notify the user 104 of unsuccessful attempts to use the ghost account in violation of the constraint(s) 116. Such an alert may indicate that the ghost account number has been compromised and that there is a possibility of fraudulent use in the future. The user 104 may then request that the ghost account be deleted and/or that a new ghost account be created to replace the possibly compromised ghost account.

Figure 3:
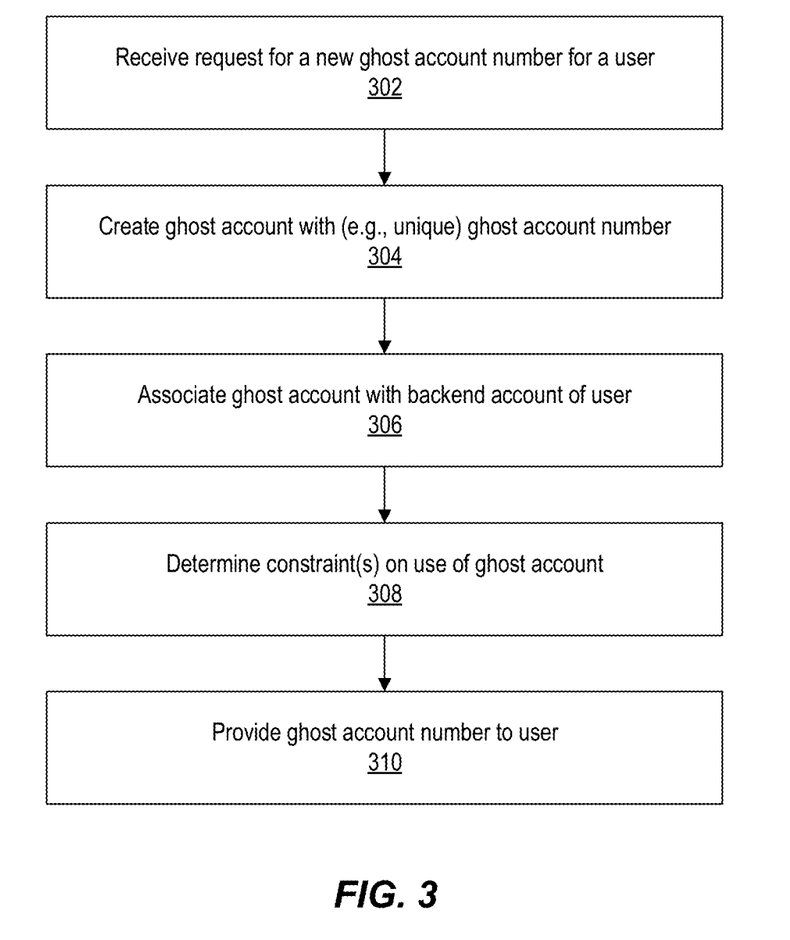
FIG. 3 depicts a flow diagram of an example process for creating a ghost account, according to implementations of the present disclosure.

FIG. 3 depicts a flow diagram of an example process for creating a ghost account, according to implementations of the present disclosure. Operations of the process may be performed by one or more of the application 108, the ghost account management module(s) 112, and/or other software module(s) executing on the user device 102, the server device(s) 110, or elsewhere.

A request may be received (302) for a new ghost account number, and ghost account, to be created for a user 104. In some instances, the request may include an indication of the backend account to be linked with the ghost account. In some instances, the request may specify constraint(s) 116 to be applied to the ghost account.

In response to the request, a ghost account may be created (304) with a ghost account number. In some implementations, the ghost account number may be unique among ghost accounts and/or backend accounts. In some implementations, the ghost account number may comply with a modulus 10 algorithm, also known as the mod 10 or Luhn algorithm, for a checksum on the ghost account number. In some implementations, a portion of the ghost account number may correspond to a portion of the associated backend account number. For example, the first six digits of the backend account number may be an issuer identification number (IIN) and/or bank identification number (BIN), and the same six digits may also be used as the first six digits of the ghost account number. In some implementations, the ghost account number may not include the same first six digits as the backend account number. In some instances, if the backend account is associated with a card verification value (CVV), the same CVV may also be associated with each ghost account linked to the backend account. In some implementations, if the backend account includes features for reward points, fraud liability limitations, and so forth, the same features may also be applied to the linked ghost account(s) and/or the purchases made using the linked ghost account(s).

The ghost account may be associated (306) (e.g., linked to) the backend account of the user 104. One or more constraints 116 may be determined (308) for the ghost account. In some instances, the user 104 may specify various constraint(s) 116 when requesting the ghost account. In some instances, the backend service (e.g., bank or other financial institution) that manages the backend account may apply certain constraint(s) 116 to the ghost account. The ghost account number may be provided (310) to the user 104 for their use, as governed by the constraint(s) 116 (if any) that have been applied to the ghost account.

Figure 4:
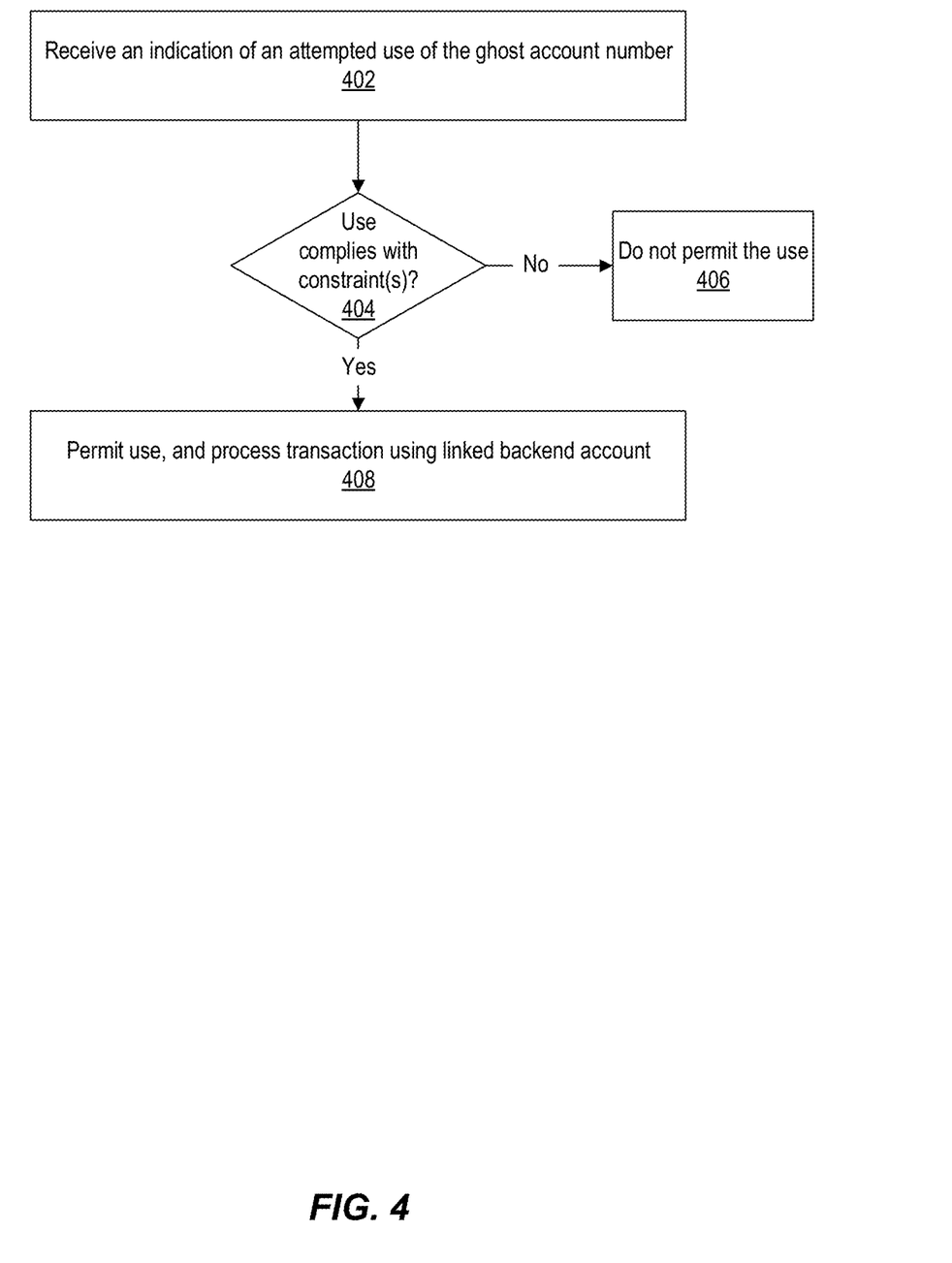
FIG. 4 depicts a flow diagram of an example process for using a ghost account subject to constraints, according to implementations of the present disclosure.

FIG. 4 depicts a flow diagram of an example process for using a ghost account subject to constraints, according to implementations of the present disclosure. Operations of the process may be performed by one or more of the application 108, the ghost account management module(s) 112, and/or other software module(s) executing on the user device 102, the server device(s) 110, or elsewhere.

An indication may be received (402) of an attempted use of the ghost account number, e.g., at one of the merchant system(s) 106. In some implementations, the indication of attempted use may be received from a payment network (e.g., Visa™, MasterCard™, American Express™ etc.) that is attempting to process the payment for the transaction based on information received from the merchant system 106. In some implementations, the indication of attempted use may be received from the merchant system 106 itself. In some implementations, the indication may be received from the merchant's financial institution that is attempting to process the transaction on behalf of the merchant.

A determination may be made (404) whether the attempted use complies with whatever constraint(s) 116 govern the use of the ghost account. If the attempted use does not comply with the constraint(s) 116, then the attempted use may not be permitted (406). If the attempted use does comply with the constraint(s) 116, then the attempted use may be permitted (408). In such instances, the backend account may be identified that is linked to the ghost account, and the transaction may be performed using the backend account number of the linked backend account. Any payment(s) associated with the transaction may be processed using the payment channel that associated with the linked backend account.

In some implementations, from the perspective of the merchant, merchant's bank, and/or payment channel, the ghost account number may appear to be simply another payment card number. The backend service that issued the ghost account number(s) and backend account number, e.g., as managed by the server device(s) 110, may identify the ghost account number as a ghost account number, determine the linkage between the ghost account number and the actual backend account number, and use the backend account and associated payment channel to process those transactions that were initiated using the ghost account number.

In some implementations, a ghost account number that is provided to a user may be later provided to the same or a different user in response to a request for a ghost account. For example, a ghost account number may be provided for a first ghost account that is limited to particular number of transactions or to a particular time period (e.g., for one day, one month, etc.). After the first ghost account expires (e.g., after the number of uses or after the time period elapses), the same ghost account number may be provided for use with a different ghost account that is created for the same user or a different user. In some implementations, the ghost account number may be reused in this manner only after all transactions previously conducted using the first ghost account have settled.

In some implementations, a same ghost account number may be used by multiple users 104 during a particular time period. In such instances, other information may be used to distinguish among the different transactions requested by the various users using the same ghost account number. For example, the user's name and/or other identifying information may be used to distinguish among the various transactions to determine which backend account is to be used to process each transaction.

Figure 5:
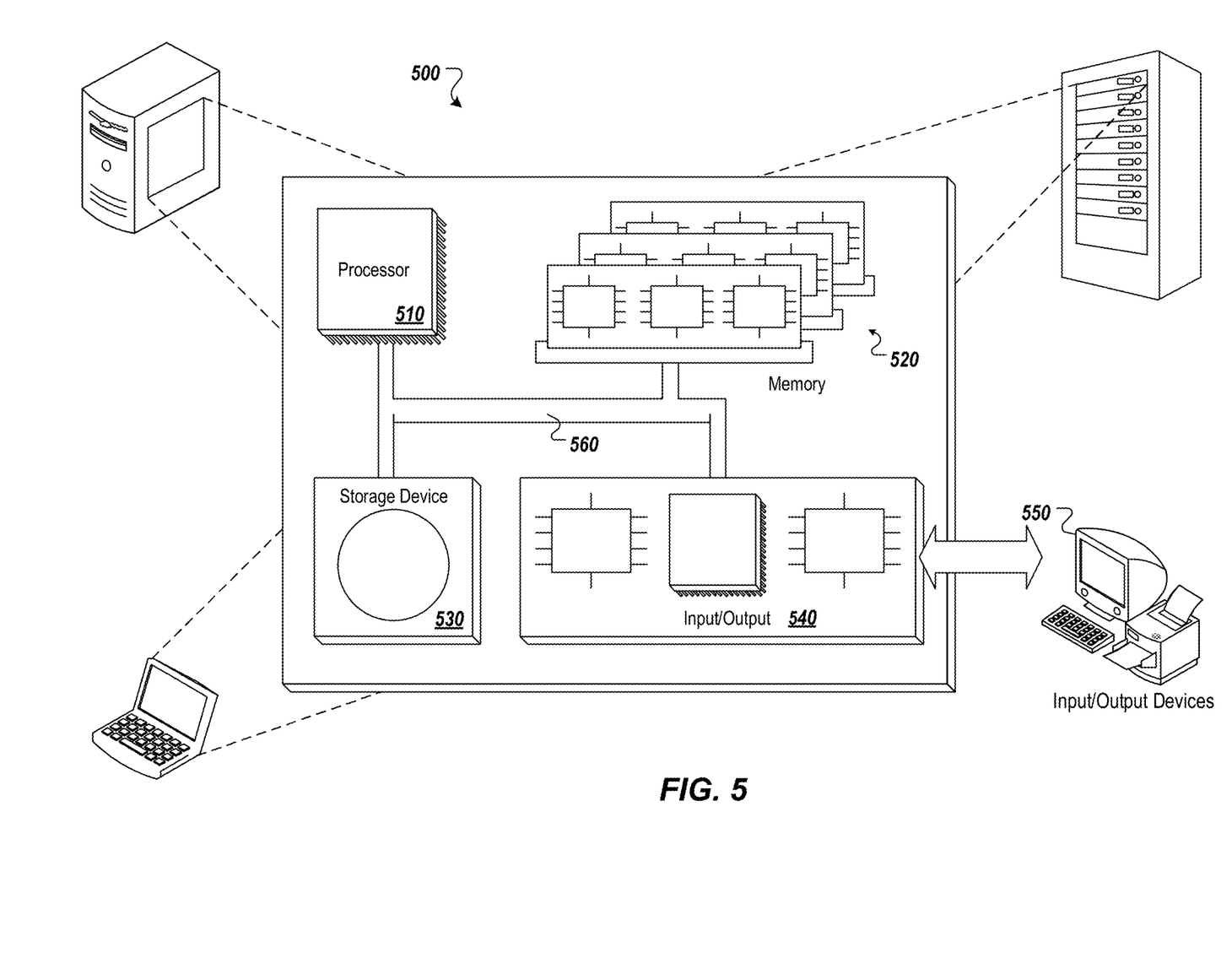
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the user device 102, the server device(s) 110, and/or other computing device(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A card device comprising:
a physical control positioned on a surface of the card device;
at least one processor; and
a memory communicatively coupled to the at least one processor, the memory storing instructions which, when executed by the at least one processor, cause the at least one processor to perform operations comprising:
accessing ghost account data for each of a plurality of ghost accounts, wherein the ghost account data for a respective ghost account indicates at least one constraint on use of the respective ghost account;
detecting a manipulation of the physical control that indicates a selection of a ghost account from the plurality of ghost accounts, and, in response, setting the selected ghost account as an active ghost account;
detecting an attempted read of the card device by a merchant system;
determining that the attempted read complies with at least one constraint on the use of the active ghost account; and
providing, in response to the attempted read, a ghost account number of the active ghost account based at least partly on determining that the attempted read complies with the at least one constraint on the use of the active ghost account,
wherein the card device further comprising:
a display positioned on the surface of the card device and configured to display the active ghost account.

2. The card device of claim 1, wherein:
the physical control is a button; and
the manipulation is at least one press of the button.

3. The card device of claim 1, the manipulation causes the setting of the active ghost account to be a next ghost account in a list of the plurality of ghost accounts that is stored in the memory.

4. The card device of claim 1, wherein the at least one constraint includes one or more of:
a location based constraint;
a time based constraint;
a number of uses constraint;
a payee based constraint;
a transaction type constraint; and
a transaction amount constraint.

5. A computer-implemented method performed by at least one processor, the method comprising:
detecting a manipulation of a physical control positioned on a surface of a card device, the manipulation indicating a selection of a ghost account from a plurality of ghost accounts that are associated with a backend account of a user;
in response to the detection, setting the selected ghost account as an active ghost account of the card device;
displaying the active ghost account on a display positioned on the surface of the card device;
receiving, by the at least one processor, an indication of an attempted use of a ghost account number associated with the active ghost account in a transaction;
accessing, by the at least one processor, ghost account data for the ghost account number, the ghost account data indicating at least one constraint on use of the ghost account; and
processing, by the at least one processor, a payment for the transaction using the backend account of the user, based at least partly on determining that the attempted use complies with the at least one constraint.

6. The computer-implemented method of claim 5, wherein the ghost account is temporary.

7. The computer-implemented method of claim 5, wherein the at least one constraint is specified by one or more of the user and a backend service that manages the backend account for the user.

8. The computer-implemented method of claim 5, wherein the at least one constraint includes one or more of:
a location based constraint;
a time based constraint;
a number of uses constraint;
a payee based constraint;
a transaction type constraint; and
a transaction amount constraint.

9. The computer-implemented method of claim 5, wherein a portion of the ghost account number corresponds to a portion of a backend account number of the backend account associated with the ghost account.

10. The computer-implemented method of claim 9, wherein the ghost account number is generated to include a same issuer identification number (IIN) as the backend account number.

11. The computer-implemented method of claim 5, wherein the ghost account number is generated and provided by a backend service that manages the backend account for the user.

12. The computer-implemented method of claim 5, further comprising:
receiving, by the at least one processor, a request for creation of the ghost account associated with the backend account of the user;
creating, by the at least one processor, the ghost account, including generating the ghost account number for the ghost account, and associating the ghost account with the backend account;
determining, by the at least one processor, the at least one constraint on use of the ghost account; and
providing, by the at least one processor, the ghost account number to the user.

13. The computer-implemented method of claim 5, further comprising:
closing, by the at least one processor, the backend account for the user;
creating, by the at least one processor, a new backend account for the user; and
associating, by the at least one processor, the ghost account with the new backend account.

14. One or more non-transitory computer-readable media storing instructions which, when executed by at least one processor, cause the at least one processor to perform operations comprising:
- detecting a manipulation of a physical control positioned on a surface of a card device, the manipulation indicating a selection of a ghost account from a plurality of ghost accounts that are associated with a backend account of a user;
- in response to the detection, setting the selected ghost account as an active ghost account of the card device;
- displaying the active ghost account on a display positioned on the surface of the card device;
- receiving an indication of an attempted use of a ghost account number associated with the active ghost account in a transaction;
- accessing ghost account data for the ghost account number, the ghost account data indicating at least one constraint on use of the ghost account; and
- processing a payment for the transaction using the backend account of the user, based at least partly on determining that the attempted use complies with the at least one constraint.

15. The one or more non-transitory computer-readable media of claim 14, wherein the at least one constraint is specified by one or more of the user and a backend service that manages the backend account for the user.

16. The one or more non-transitory computer-readable media of claim 14, wherein the at least one constraint includes one or more of:
- a location based constraint;
- a time based constraint;
- a number of uses constraint;
- a payee based constraint;
- a transaction type constraint; and
- a transaction amount constraint.

17. The one or more non-transitory computer-readable media of claim 14, wherein a portion of the ghost account number corresponds to a portion of a backend account number of the backend account associated with the ghost account.

18. The one or more non-transitory computer-readable media of claim 14, wherein the ghost account number is generated and provided by a backend service that manages the backend account for the user.

19. The one or more non-transitory computer-readable media of claim 14, the operations further comprising:
- receiving a request for creation of the ghost account associated with the backend account of the user;
- creating the ghost account, including generating the ghost account number for the ghost account, and associating the ghost account with the backend account;
- determining the at least one constraint on use of the ghost account; and
- providing the ghost account number to the user.

\* \* \* \* \*